(12) United States Patent
Kaplanis et al.

(10) Patent No.: US 12,204,699 B2
(45) Date of Patent: Jan. 21, 2025

(54) ROUTING INPUT TO ON-SCREEN DISPLAY

(71) Applicant: Hewlett-Packard Development Company, L.P., Spring, TX (US)

(72) Inventors: Anthony N. Kaplanis, Spring, TX (US); John W. Frederick, Spring, TX (US); Timothy P. Guynes, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 62 days.

(21) Appl. No.: 17/617,426

(22) PCT Filed: Sep. 27, 2019

(86) PCT No.: PCT/US2019/053630
§ 371 (c)(1),
(2) Date: Dec. 8, 2021

(87) PCT Pub. No.: WO2021/061163
PCT Pub. Date: Apr. 1, 2021

(65) Prior Publication Data
US 2022/0244794 A1 Aug. 4, 2022

(51) Int. Cl.
*G06F 3/023* (2006.01)
*G06F 13/42* (2006.01)
*H04N 21/426* (2011.01)

(52) U.S. Cl.
CPC .......... *G06F 3/023* (2013.01); *G06F 13/4282* (2013.01); *H04N 21/42653* (2013.01)

(58) Field of Classification Search
CPC ................ G06F 13/4282; G06F 3/023; H04N 21/42653
See application file for complete search history.

(56) References Cited

U.S. PATENT DOCUMENTS

| 7,420,544 B2 | 9/2008 | Ono et al. |
| 7,782,340 B2 | 8/2010 | Huang et al. |
| 2007/0152972 A1 | 7/2007 | Zhang |
| 2010/0090968 A1 | 4/2010 | Lee et al. |
| 2015/0040177 A1* | 2/2015 | Chen ..................... G09G 5/003 725/131 |

FOREIGN PATENT DOCUMENTS

| CN | 101963889 A | 2/2011 |
| CN | 102279654 A | 12/2011 |
| CN | 104750265 A | 7/2015 |
| CN | 105094356 A | 11/2015 |

* cited by examiner

*Primary Examiner* — Yaron Cohen
(74) *Attorney, Agent, or Firm* — Quarles & Brady LLP (57) ABSTRACT

An example display system includes an on-screen display (OSD) circuit, an input/output (I/O) controller, and a map engine. The OSD circuit operates a functionality of a display device. The I/O controller routes input from a peripheral device to the OSD circuit when the OSD mode is active. The map engine causes activation of the OSD mode when an input sequence received by the I/O controller corresponds to an OSD mode activation sequence.

19 Claims, 6 Drawing Sheets

┌─────────────────────────────────────────────────────────────┐
│ 502 SET A DESIGNATED INPUT SEQUENCE BASED ON USER INPUT     │
└─────────────────────────────────────────────────────────────┘
                              ↓
┌─────────────────────────────────────────────────────────────┐
│ 504 REVIEW PERIPHERAL INPUT FOR THE DESIGNATED INPUT        │
│                       SEQUENCE                              │
└─────────────────────────────────────────────────────────────┘
                              ↓
┌─────────────────────────────────────────────────────────────┐
│ 506 ROUTE THE PERIPHERAL INPUT FROM THE I/O CONTROLLER TO   │
│ A VIDEO PROCESSOR WHEN THE DESIGNATED INPUT SEQUENCE IS     │
│                       IDENTIFIED                            │
└─────────────────────────────────────────────────────────────┘
                              ↓
┌─────────────────────────────────────────────────────────────┐
│ 508 CAUSE EXECUTION OF AN ON-SCREEN DISPLAY OPERATION       │
│           CORRESPONDING TO THE PERIPHERAL INPUT             │
└─────────────────────────────────────────────────────────────┘

┌─────────────────────────────────────────────────────────────┐
│ 602 RECEIVE A SET OF INPUTS FROM A PERIPHERAL DEVICE        │
│              CONNECTED TO A DISPLAY DEVICE                  │
└─────────────────────────────────────────────────────────────┘
                              ↓
┌─────────────────────────────────────────────────────────────┐
│ 604 DETERMINE THE SET OF INPUTS CORRESPOND TO OSD           │
│                    FUNCTIONALITY                            │
└─────────────────────────────────────────────────────────────┘
                              ↓
┌─────────────────────────────────────────────────────────────┐
│ 606 CAUSE SUSPENSION OF A WAKE OPTION CORRESPONDING TO      │
│                A SIGNAL FROM A PERIPHERAL                   │
└─────────────────────────────────────────────────────────────┘
                              ↓
┌─────────────────────────────────────────────────────────────┐
│ 608 ROUTE THE SET OF INPUTS TO A VIDEO PROCESSOR HAVING     │
│   OSD CAPABILITIES TO PERFORM THE OSD FUNCTIONALITY         │
│  WITHOUT WAKING A HOST DEVICE COUPLED TO THE DISPLAY        │
│                        DEVICE                               │
└─────────────────────────────────────────────────────────────┘

ROUTING INPUT TO ON-SCREEN DISPLAY

BACKGROUND

Computer systems may include a host for processing computing operations and a display for providing visual imagery to a user based on the operations performed on the host. A display device, for example, may produce a visual representation of an image by operating light circuitry represented as a number of pixels based on processed image data. A display device may have user-adjustable settings which may be accessed through an on-screen display (OSD) using external buttons on the housing of the display device.

DETAILED DESCRIPTION

In the following description and figures, some example implementations of display apparatus, display systems, and/or or methods of operating an on-screen display (OSD) are described. A display device presents (e.g., displays) an image on a panel using color data (e.g., such as red, green, and blue (RGB) channel data) to determine a color to display for every pixel on the panel. A display device may have adjustable display settings, such as color and brightness settings. The display device may include external buttons that allow for a user to cause an OSD menu to appear on a panel of the display device, navigate the OSD menu, and select an OSD operation to perform. Using external buttons to operate the OSD of a display device may be cumbersome for users working in a mobile working environment, users who desire to customize display settings, or users that request different OSD features for different application, as examples.

Various examples described below relate to operating an OSD of a display device using input from a peripheral device, such as a keyboard. The user may define an input sequence to activate OSD mode of operation or define various input sequences to directly access and perform features of the OSD rather than send the peripheral input to the host. In this manner, a user may use the features of the OSD using any human-computer interface device that the user may be comfortable with rather than the OSD-specific mechanical operations or requiring the host to execute a hotkey server to identify and perform operations with the display device.

Figure 1:
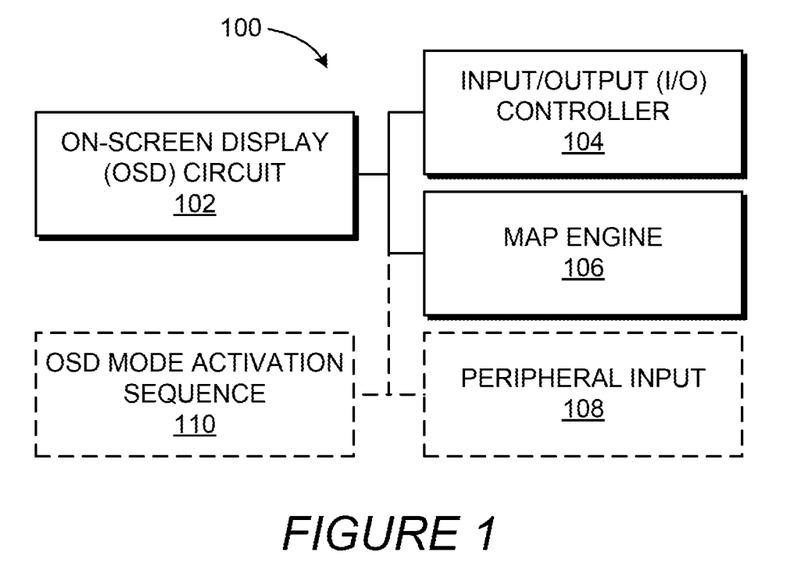
FIGS. 1 and 2 are block diagrams depicting example display systems.
Figure 2:
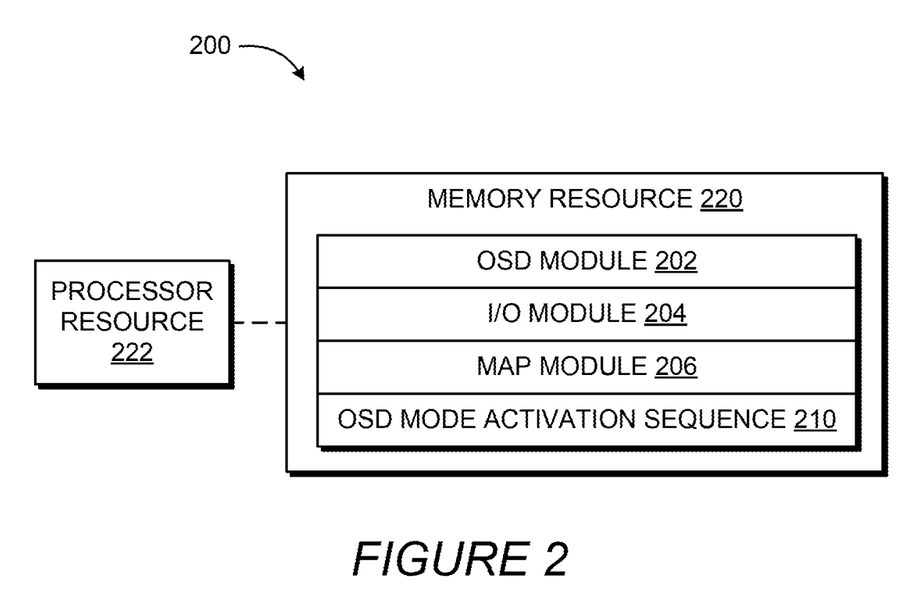

FIGS. 1 and 2 are block diagrams depicting example display systems 100 and 200. Referring to FIG. 1, the example display system 100 of FIG. 1 generally includes an OSD circuit 102, an input/output (I/O) controller 104, and a map engine 106. In general, the I/O controller 104 loads an input sequence via the map engine 106 to watch for in input received by the I/O controller 104 and, when the input sequence is identified, sends the input at the I/O controller 104 to the OSD circuit 102 (e.g., rather than the host). The dotted lines of FIG. 1 represent items that may not be present until operation of the display system 100 occurs, such as when the user enters an input sequence to be designated as the OSD mode activation sequence 110. As used herein, OSD mode refers to a mode of operation of the I/O controller 104 that allows for routing an input signal to a coupled OSD circuit 102, and passthrough mode refers to a mode of operation of the I/O controller 104 that allows for routing a signal from an input port coupled to the I/O controller 104 to an output port coupled to the I/O controller 104.

The OSD circuit 102 represents any circuitry or combination of circuitry and executable instructions to operate a functionality of a display device. The display functionalities of a display device (and OSD) may include controls grouped into categories, such as brightness, color, image, input, power, menu, management, and information. Display functionalities may include appearance operations, such as brightness level adjustment, color settings adjustment (e.g., change in color profile), image adjustment (e.g., change response time or sharpness), change position or size of the OSD menu, picture-in-picture adjustment, etc. The OSD of the display device may also include operational features independent of the appearance adjustment features but use the format or other resources of the OSD to implement. Example operational features include device operations, such as switch an input source, set a power schedule or other power savings options for the display, set an OSD menu option, set a timer that appears using the OSD menu, change the appearance of a cursor or crosshair, select a language of the OSD, etc.

The OSD circuit 102 may include circuitry or a combination of circuitry and executable instructions to provide a user the ability to enter user-defined input combinations to activate OSD functions. For example, the OSD circuit 102 may include a combination of circuitry and executable instructions to provide an OSD activation key feature for a user to enter a first key combination to assign as a designated input combination to activate the OSD mode and a second key combination to assign as a designated input combination to activate a submenu function of the OSD menu. In this manner, subsequent input combinations from a peripheral may cause the OSD circuit to execute an operation to perform an OSD function when the designated input combinations are provided to the I/O controller 104 based on input sequence forwarded to the OSD circuit 102 from the I/O controller 104. In some examples, the peripheral input received may be a combination of input signals from multiple peripherals. For example, the OSD menu may be opened when signal is received corresponding to a computer mouse input signal (such as holding a right click button) received concurrently with a combination of keyboard input signals (such as a holding down "Shift+ALT") to open the OSD menu with subsequent presses of the arrow keys of the keyboard to indicate designated OSD menu navigation functions.

The OSD functions performed in response to a designated input combination may allow for entering a submenu to be presented and showing the submenu function being selected. In other examples, the OSD functions may be performed without causing the OSD operations to be presented on the display device. For example, the OSD circuit may receive a designated input combination from a peripheral device associated with changing the display to a power saving mode and setting a timer, where the display device may change the power saving mode and start a timer without displaying the power mode change or the timer. The OSD circuit 102 includes circuitry capable to receive input from an I/O controller such that input from a peripheral coupled to the I/O controller causes display of an OSD menu on a panel of the display device and navigation through the OSD menu.

The I/O controller 104 represents any circuitry or combination of circuitry and executable instructions to route input received at a port to a destination. The I/O controller 104 may receive data from an input port and determine to send the data to the OSD circuit 102 (which may be connected to an output port or directly wired to the I/O controller 104 and/or hub) or to an output port (e.g., the port on which the host computer device is connected) based on an input sequence received at the I/O controller (e.g., based on the mode of operation of the I/O controller as determined by an input sequence received at the input port of the I/O hub. In some examples, the destination may not be to an output port but may be directly, electrically routed to the OSD circuit or a processor hosting an operating system (OS). For example, the I/O controller 104 may be a combination of circuitry and executable instructions that receive input from a peripheral device connected to an input port coupled to the I/O controller 104 and route the peripheral input 108 to a host via an output port coupled to the I/O controller 104 when passthrough mode is activated or route the input to the OSD circuit 102 when OSD mode is active. For another example, the I/O controller 104 may be a combination of circuitry and executable instructions that receive input from an input port connectable to a peripheral device and direct the received input to a scaler or a processor resource hosting an application that operates the display of the OSD menu. In some examples, the I/O controller 104 routes peripheral input to the OSD circuit 102 as well as an output port to a second display device, such that the I/O controller of the second display device also identifies whether to route the peripheral input to the OSD circuit of the second display device or not.

The I/O controller 104 may be integrated into an I/O hub with input ports and output ports. An example I/O controller 104 may be a universal serial bus (USB) controller, such as a USB controller for a USB hub integrated in the display device. The I/O controller 104 may be set to an operational mode by maintaining a memory resource location and performing a check at that memory resource location (e.g., toggle the I/O controller 104 between the OSD mode and the passthrough mode based on a flag set in a memory resource where the flag setting causes a processor resource to perform operations corresponding to the mode represented by the flag setting).

The I/O controller 104 may include circuitry or a combination of circuitry and executable instructions to watch an input stream for the designated input combination (e.g., the OSD mode activation sequence 110) to activate the OSD mode and route input from the peripheral device to the OSD circuit when the OSD mode is active until a second user-defined key sequence corresponding to deactivation of the OSD mode is received by the I/O controller 104. For example, the I/O controller 104 may be a combination of circuitry and executable instructions to, in response to receipt of a designated input combination, forward data from the input stream to the video processor when the I/O controller 104 identifies a key sequence corresponding to the designated input combination when watching the input stream.

The map engine 106 represents any circuitry or combination of circuitry and executable instructions to cause activation of the OSD mode when an input sequence received by the I/O controller 104 corresponds to an OSD mode activation sequence 110. For example, the map engine 106 may be a combination of circuitry and executable instructions to configure or otherwise cause the I/O controller 104 to watch for a user-defined key sequence corresponding to activation of the OSD mode, such as when the user has provided user-defined input via the OSD and the map engine 106 sets, in response to the user input, the designated input combination for the I/O controller to watch for based on user-defined input.

The map engine 106 may be a combination of circuitry and executable instructions to manage the OSD activation configuration of the I/O controller, such as by using a map data structure of input sequences that corresponding OSD features. For example, the map engine 106 may be a combination of executable instructions to maintain a dictionary, look up table, or other map data structure of input sequences corresponding to OSD functionality where an entry, such as a four-key input combination, may be entered and assigned as a designation that directly performs an OSD submenu selection.

The OSD circuit 102, the I/O controller 104, and the map engine 106 may interface to provide coordinated operations based on desired input associations. For example, when the peripheral input 108 received by the I/O controller 104 includes a user-defined key sequence to a specific OSD operation, the OSD mode may be activated on the I/O controller 104 to begin passing data to the OSD circuit 102, the I/O controller 104 may pass the specific OSD operation to the OSD circuit 102 or the peripheral input 108 to the OSD circuit 102, operations of the OSD are performed corresponding to the peripheral input 108, and the I/O controller 104 is immediately returned to the passthrough mode for subsequent peripheral input 108. In other examples, the I/O controller 104 may remain in active OSD mode until disabled by a designated input command or until a time threshold expires without peripheral input 108 being received by the I/O controller 104. In such an example, the time threshold may be stored by the OSD circuit 102 and associated with a default time of display of the OSD. In some examples, OSD submenu functionality may be described as groups of OSD mode activation sequences where each designated input sequences represents an OSD function selection of the OSD circuit 102 as well as OSD mode activation of the I/O controller 104.

The map engine 106 may be implemented as part of the I/O controller 104, such that the I/O controller 104 activates OSD mode whenever one of the input sequences in the map is identified while watching the input from the peripheral. In other examples, the OSD circuit 102, I/O controller 104, and/or the map engine 106 may be implemented on an image processor. An image processor represents any circuitry or combination of circuitry and executable instructions to operate a display. For example, an image processor may be circuitry to perform processing operations on image data, such as video data, and cause the processed data to present on a screen of a display device. Examples of an image processor include a video processor, a graphics processing unit (GPU), a scaler, a field-programmable gate array (FPGA), and the like. A scaler, as used herein, is circuitry of a display device that performs scaling of visual output from a host device to the size of the screen (e.g., visible area of the panel) of the display device and operates the display device to present the visual output. For example, a scaler may perform image processing operations (such as converting video signal from one display resolution to another) and electrical control operations to coordinate emission of light from pixels to generate a perception of color. In this manner, the image processor may include a processor resource with a specific control program to perform video processing operations, including scaling operations. The OSD circuit 102 may be a portion of circuitry of a video processor integrated in a display device.

The display system 100 may coordinate OSD operation among multiple display devices. For example, the display system 100 may include multiple computer monitors coupled to a single host, where the multiple computer monitors may be serially connected in a daisy chain capable of passing signals between each monitor (e.g., serially pass signals to downstream devices). For example, peripheral input received by the I/O controller 104 of a first monitor may be sent to an output port to the input port of a second monitor. In such an example, each monitor may include an OSD circuit 102 to operate the OSD for that specific monitor and an I/O controller 104 to coordinate signal transfer among the I/O ports for each monitor. A map engine 104 may be located separately on each monitor or the map engine 106 may be distributed across devices. In such multiple monitor examples, a peripheral device input may be physically connected to one of the monitors, where the I/O controller 104 of one monitor is able to transfer the peripheral input to another connected monitor. In this manner, the display system 100 may operate such that each I/O controller 104 for each monitor is set up to recognize a designated input sequence and operate the OSD accordingly as well as pass along the input sequence to a subsequently connected monitor, where the OSD of the subsequent monitor may also be operated by the same designated input sequence. In this manner, all I/O controllers 104 may be set into OSD mode by the same designated input sequence or the I/O controller 104 may be individually set into OSD mode by a device-specific designated input sequence. Similarly, a shortcut to a specific OSD function may be sent to all or a subset of connected monitors, as an example.

In other examples, each I/O controller 104 may have a display-specific identifier noted by the map engine 106, where an input sequence may be transferred to each I/O controller and sent to the OSD of the display corresponding to the display-specific identifier. For example, the map engine 106 may include a look up table with an entry for "CTRL+ALT+B+U" to operate an increase in brightness as well as display associations using identifiers of "1," "2," and "3" corresponding to monitors in a daisy chain, where the input sequence of "CTRL+ALT+B+U" followed by "1" and "3" sends the brightness increase command to the first and third monitor (and not the second)—in other words, the I/O controllers of the first and third monitor route the peripheral input to their corresponding OSD circuits and the I/O controller of the second monitor does not route (e.g., actively ignores) the peripheral input to the OSD circuit. In this manner, the OSD of one or more display may be operated concurrently by peripheral input.

In some examples, functionalities described herein in relation to any of FIGS. 1-4 may be provided in combination with functionalities described herein in relation to any of FIGS. 5-8.

FIG. 2 depicts the example system 200 may comprise a memory resource 220 operatively coupled to a processor resource 222. Referring to FIG. 2, the memory resource 220 may contain a set of instructions that are executable by the processor resource 222. The memory resource 220 may contain data useable with execution of the set instructions, such as the factory calibration measurement data 206. The set of instructions are operable to cause the processor resource 222 to perform operations of the system 200 when the set of instructions are executed by the processor resource 222. The set of instructions stored on the memory resource 220 may be represented as an OSD module 202, an I/O module 204, and a map module 206. The OSD module 202, the I/O module 204, and the map module 206 represent program instructions that when executed cause function of the OSD circuit 102, the I/O controller 104, and the map engine 106 of FIG. 1, respectively. The processor resource 222 may carry out a set of instructions to execute the modules 202, 204, 206, and/or any other appropriate operations among and/or associated with the modules of the system 200.

For example, the processor resource 222 may carry out a set of instructions to set a designated input sequence to be recognizable by an I/O controller using a map data structure of OSD activation commands based on a sequence of key inputs provided by a user, review peripheral input received by the I/O controller for the designated input sequence, route the peripheral input from the I/O controller directly to a video processor (e.g., without accessing the host) when the designated input sequence is identified by the I/O controller (e.g., route input in response to identification of the designated input sequence), and cause execution of an on-screen display (OSD) operation corresponding to (and in response to) the peripheral input.

For another example, the processor resource 222 may carry out a set of instructions to maintain the map data structure with correlations between key combinations and OSD functionalities, update the identifiable I/O controller sequences to identify and route the peripheral input to the OSD circuit in response to a change in the map data structure (e.g., such as a change to a key sequence corresponding to activation of OSD mode by the I/O controller based on user input), cause the I/O controller to activate OSD mode to route the peripheral input to the video processor until an OSD mode deactivation input sequence is received by the I/O controller, and cause an OSD menu to present on a panel of a display device.

For yet another example, the processor resource 222 may carry out a set of instructions to cause a first I/O controller of a first display device to receive a plurality of groups of peripheral input, send a first group of peripheral input to a host device, cause an OSD menu to appear on a panel of the first display device at an OSD submenu in response to a determination that a peripheral input sequence is an OSD submenu request, send a second group of peripheral input to a first OSD circuit of the first display device based on the receipt of a user-defined OSD activation sequence loaded into the first I/O controller, perform a selection at the OSD submenu of the first OSD circuit based on the peripheral input sequence, and send the second group of peripheral input to a second, downstream display device for a second I/O controller of the second, downstream display device to determine whether to send the peripheral input sequence to a second OSD circuit of the second, downstream display device.

Figure 3:
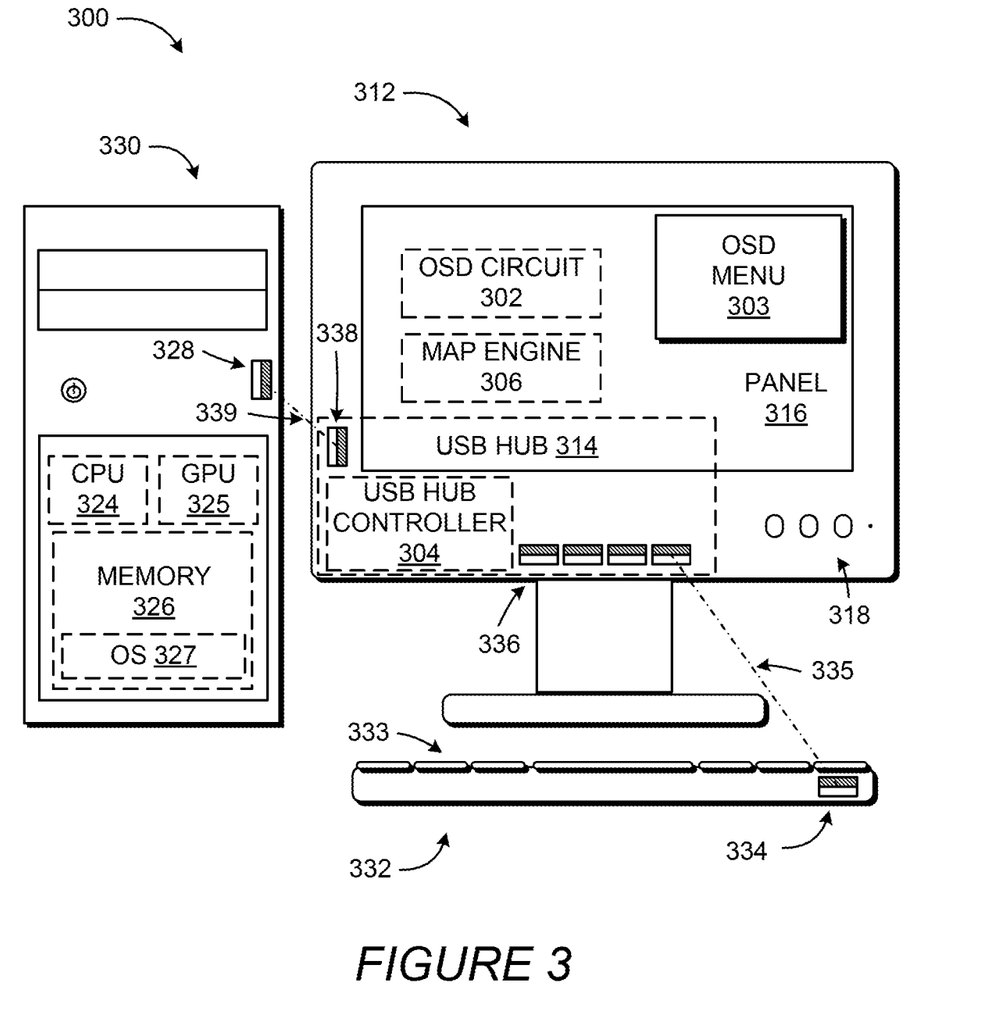
FIG. 3 depicts an example environment in which an example display system may be implemented.
Figure 4:
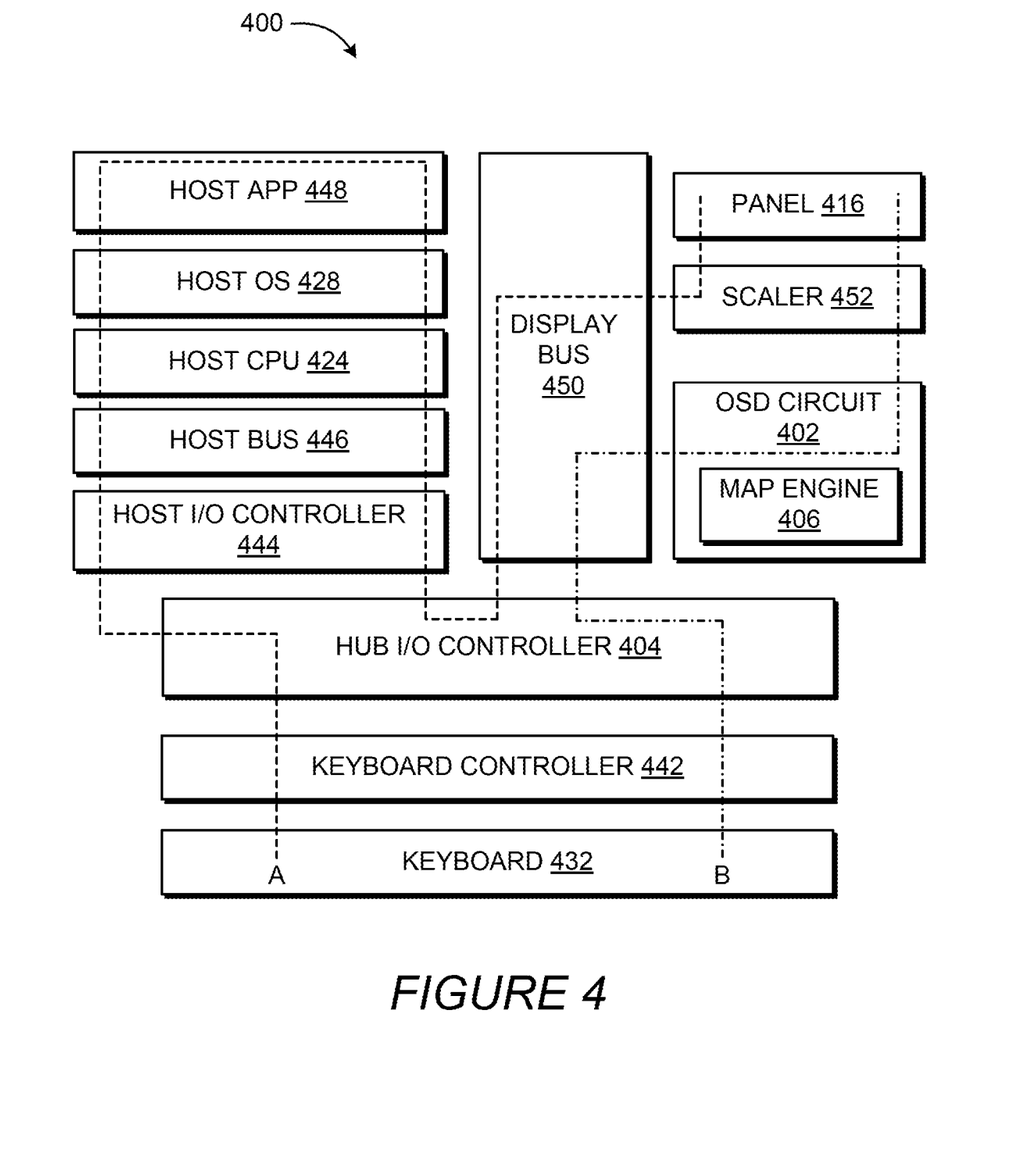
FIG. 4 is a block diagram depicting example process workflows via example components useable to implement an example display system.

Although these particular modules and various other modules are illustrated and discussed in relation to FIG. 2 and other example implementations, other combinations or sub-combinations of modules may be included within other implementations. Said differently, although the modules illustrated in FIG. 2 and discussed in other example implementations perform specific functionalities in the examples discussed herein, these and other functionalities may be accomplished, implemented, or realized at different modules or at combinations of modules. For example, two or more modules illustrated and/or discussed as separate may be combined into a module that performs the functionalities discussed in relation to the two modules. As another example, functionalities performed at one module as discussed in relation to these examples may be performed at a different module or different modules. FIGS. 3 and 4 depict yet other examples of how functionality may be organized into modules.

A processor resource is any appropriate circuitry capable of processing (e.g., computing) instructions, such as one or multiple processing elements capable of retrieving instructions from a memory resource and executing those instructions. For example, the processor resource 222 may be a central processing unit (CPU) that enables routing input to an OSD by fetching, decoding, and executing modules 202, 204, and 206. Example processor resources include at least one CPU, a semiconductor-based microprocessor, a programmable logic device (PLD), and the like. Example PLDs include an application specific integrated circuit (ASIC), a FPGA, a programmable array logic (PAL), a complex programmable logic device (CPLD), and an erasable programmable logic device (EPLD). A processor resource may include multiple processing elements that are integrated in a single device or distributed across devices. A processor resource may process the instructions serially, concurrently, or in partial concurrence.

A memory resource represents a medium to store data utilized and/or produced by the system 200. The medium is any non-transitory medium or combination of non-transitory media able to electronically store data, such as modules of the system 200 and/or data used by the system 200. For example, the medium may be a storage medium, which is distinct from a transitory transmission medium, such as a signal. The medium may be machine-readable, such as computer-readable. The medium may be an electronic, magnetic, optical, or other physical storage device that is capable of containing (i.e., storing) executable instructions. A memory resource may be said to store program instructions that when executed by a processor resource cause the processor resource to implement functionality of the system 200 of FIG. 2. A memory resource may be integrated in the same device as a processor resource or it may be separate but accessible to that device and the processor resource. A memory resource may be distributed across devices.

In the discussion herein, the components 102, 104, and 106 of FIG. 1 and the modules 202, 204, and 206 of FIG. 2 have been described as circuitry or a combination of circuitry and executable instructions. Such components may be implemented in a number of fashions. Looking at FIG. 2, the executable instructions may be processor-executable instructions, such as program instructions, stored on the memory resource 220, which is a tangible, non-transitory computer-readable storage medium, and the circuitry may be electronic circuitry, such as processor resource 222, for executing those instructions. The instructions residing on a memory resource may comprise any set of instructions to be executed directly (such as machine code) or indirectly (such as a script) by a processor resource.

In some examples, the system 200 may include the executable instructions may be part of an installation package that when installed may be executed by a processor resource to perform operations of the system 200, such as methods described with regards to FIGS. 5-8. In that example, a memory resource may be a portable medium such as a compact disc, a digital video disc, a flash drive, or memory maintained by a computer device, such as a server, from which the installation package may be downloaded and installed. In another example, the executable instructions may be part of an application or applications already installed. A memory resource may be a non-volatile memory resource such as read-only memory (ROM), a volatile memory resource such as random-access memory (RAM), a storage device, or a combination thereof. Example forms of a memory resource include static RAM (SRAM), dynamic RAM (DRAM), electrically erasable programmable ROM (EEPROM), flash memory, or the like. A memory resource may include integrated memory such as a hard drive (HD), a solid-state drive (SSD), or an optical drive.

FIG. 3 depicts an example environment in which an example display system 300 may be implemented. Referring to FIG. 3, an example computing system 300 generally includes a host device 330, a display device 312, and a peripheral device 332. In this example, computing device 330 and display device 312 are separate devices, such as desktop tower and a standalone computer monitor. In other examples the device 330, 312, and/or 332 may be integrated together as a single unit, such as an all-in-one desktop computer or a laptop computer. In yet other examples, computing system 300 in general and/or display device 312 may take the form of a head-mounted display (HMD) that provides an augmented reality (AR) or virtual reality (VR) experience to a wearer and the peripheral device 332 may be controller input.

The computing device 330 may include logic in the form of a CPU 324 and a GPU 325. In some examples, GPU 325 may be a discrete GPU that is separate and independent from CPU 324. In other examples, the functionalities of CPU 324 and GPU 325 may be combined into a single unit, such as a CPU with integrated graphics. CPU 324 and/or GPU 325 may be operably coupled with various types of memory, collectively represented by memory 326 in FIG. 3. Memory 326 may include, for instance, ROM, RAM, various types of non-volatile memory, etc.

Memory 326 may include, e.g., in the form of computer-executable instructions loaded in RAM from non-volatile memory, an OS 327, and applications that may execute on top of the OS 327. Among other things, applications executed on the host device 330 may include graphics intensive applications and therefore may utilize multiple different luminosity ranges and/or display modes of the display 314. Such graphics-intensive applications may include, for instance, video games, photo editors, animation editors, graphic design applications, movie editors, computer-aided design (CAD) applications, image compositing applications, color grading applications, and so forth.

The computing device 330 may include other components commonly found in computing devices. As non-limited examples, in FIG. 3, computing device includes I/O interface(s) (such as port 328) and a network interface card (NIC). I/O interface(s) may include ports compatible with connection to a peripheral device, for instance, a keyboard, mouse, microphone, digital camera, etc.

The host device 330 may include a display communication channel to exchange video transmissions with the display device 312. The display communication channel(s) of the host device 330 may take various forms, such as Video Graphics Array (VGA), Digital Visual Interface (DVI), High-Definition Multimedia Interface (HDMI), DisplayPort (DP) and/or Embedded DisplayPort (eDP), Low-Voltage Differential Signaling (LVDS), V-by-One, Universal Serial Bus (USB), Display Data Channel Connection Interface (DDC/CI), Inter-Integrated Channel ($I^2C$), Auxiliary Interface (AUX), etc. A single display communication channel 339 occurring via port 328 of the host device 330 and port 338 of the display device 312 is shown in FIG. 3, however, multiple connections may be implemented, such as a first connection dedicated to transmitting visual data and a second connection for transmitting data for other peripheral devices, such as a keyboard.

The display device 312 may include logic, such as an OSD circuit 302, an I/O controller (e.g., the USB hub controller 304 of FIG. 3), and a map engine 306 that are the same as the OSD circuit 102, the I/O controller 104, and the map engine 106 of FIG. 1. The display logic may take various forms, such as a timing controller (TCON), a scaler chip or controller, a FPGA, and/or an ASIC. The display device 312 may include buttons 318 to perform OSD operations, such as navigating through the OSD menu 303 on the panel 316.

The peripheral device 332 may generally include an input mechanism 333, such as keys on a keyboard, and an output port 334 to connect to the display device 334. The peripheral device 332 may be coupled to the display device 312 via an I/O interface. In the example shown in FIG. 3, the peripheral device 332 may be physically coupled to the display device 312 via a connection (e.g., a cable) between the output port 334 of the peripheral device 332 and one of the input ports 336 of the display device 312.

The input ports 336 and the output port 338 may be part of a I/O hub integrated in the display device, such as USB hub 314 integrated in the display device 312 of FIG. 3. The input ports 336 are electrically coupled to the USB hub controller 304 and the output port 338, such that input received at the input ports 336 may be routed to the output port 338 to send to the host device 330 via the port 328. In this manner, input received from the input mechanism 333 is translated to data transferrable from peripheral device 332 via connection 335 between ports 334 and 336 and passed on or otherwise routed from the display device 312 to the host device 330 via connection 339 between ports 338 and 328 based on operational mode of the USB hub controller 304. Indeed, in some examples (such as described with respect to FIG. 4) the USB hub controller 304 may determine that the input received via connection 335 is to be transferred to the OSD circuit 302 to operate the OSD menu 303 without being transferred to the OS 327 via connection 339 to the host device 330.

FIG. 4 is a block diagram depicting example process workflows via example components useable to implement an example display system 400. FIG. 4 generally includes blocks representing logical divisions of hardware and processing architecture. Referring to FIG. 4, the example components of FIG. 4 generally include I/O components, host components, and display components. The I/O components include the keyboard 432, the keyboard controller 442, and the hub I/O controller 404. The host components include the host I/O controller 444, the host bus 446, the host CPU 424, the host OS 428, and the host app 448. The display components include the display bus 450, the panel 416, the scaler 452, the OSD circuit 402, and the map engine 406. The descriptions of OSD circuit 102, the I/O controller 104, and the map engine 106 of FIG. 1 are applicable to the OSD circuit 402, the hub I/O controller 404, and the map engine 406 of FIG. 4 and, for brevity, are not repeated in their entirety.

Physical interaction with the keyboard 432 operates mechanical change in keys of the keyboard to produce electrical signals, which the keyboard controller 442 communicates as input to the hub I/O controller 404. FIG. 4 depicts two process workflows (designated as flow A and flow B) based on the types of peripheral input and/or the operational mode of the hub I/O controller 404.

Referring to flow A of FIG. 4 depicted as a dashed line, the input from the keyboard 432 to the keyboard controller 442 is transferred from the hub I/O controller 404 to the host I/O controller 444 when the hub I/O controller 404 is in passthrough mode (e.g., an OSD mode activation sequence was not received in the peripheral input from the keyboard 432). In that circumstance, the hub I/O controller 404 transfers the peripheral input to the host I/O controller 444 to be used by the host. The host I/O controller 444 passes the peripheral input to the host CPU 424 via the host bus 446, such that the host OS 428 executed by the host CPU 424 can received the peripheral input and perform a function on the host, such as provided the peripheral input to a host application 448. The host application 448 (or the host OS 428 in some examples) performs an operation using the peripheral input 448 and initiates a change to the visual output of the host. Thus, the process generates a communication chain from the host application 448 to the host OS 428 and the host CPU 424 transfers the updated video data to the host I/O controller 444 via the host bus 446 to a port connected to the hub I/O controller 404 designated for communication with a display device. The hub I/O controller 404 transfers the video data to the video processor of the display device, such as a scaler 452, via the display bus 450, as depicted in flow A of FIG. 4. The scaler 452 instructs the panel 416 to display the video image corresponding to the change in the host application 448 based on the peripheral input received from the keyboard 432, and the process of flow A is completed.

Referring to flow B of FIG. 4 depicted as a dash-dot-dash line, the input to the hub I/O controller 404 from the keyboard controller 442 is transferred to the OSD circuit 402 when the hub I/O controller 404 is in OSD mode (e.g., an OSD mode activation sequence was received in the peripheral input from the keyboard 432). In that circumstance, the hub I/O controller 404 transfers the peripheral input to the OSD circuit 402 via the display bus 450. The OSD circuit 402 may perform an OSD function based on the peripheral input received while the hub I/O controller 404 is in OSD mode. If the OSD function is to cause a visual change, the OSD circuit 402 may instruct the scaler 452 to operate the panel to show the change, such as pulling up an OSD submenu. In this manner, a peripheral device may operate the OSD of the display device and avoid using host resources to perform OSD operations since the hub I/O controller 404 is able to route the electrical signals to the OSD circuit 402 directly, as an example. In this manner, OS-enabled OSD interaction may be avoided, as an example.

Figure 5:
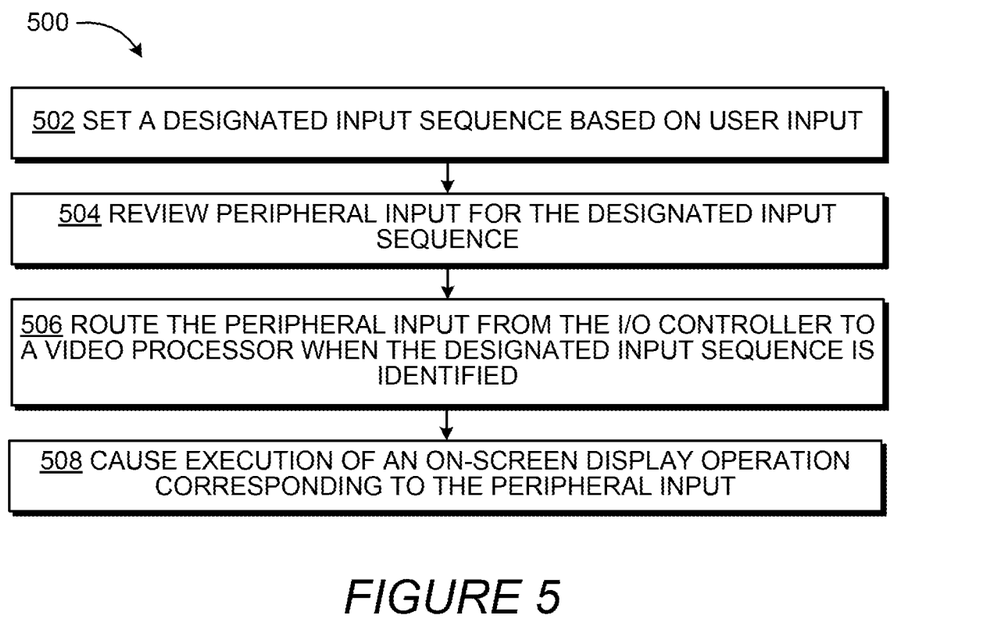
FIGS. 5-8 are flow diagrams depicting example methods of operating an on-screen display.

FIGS. 5-8 are flow diagrams depicting example methods 500, 600, 700, and 800 of operating an OSD. Referring to FIG. 5, example method 500 of operating an OSD may generally comprise setting a designated input sequence, reviewing peripheral input for the designated input sequence, routing the peripheral input from the I/O controller to a video processor when the designated input sequence is identified, and causing execution of an OSD operation corresponding to the peripheral input. The method 500 may be performed by components of a display system as discussed herein, such as the OSD circuit 102, the I/O controller 104, and the map engine 106 of FIG. 1.

At block 502, a designated input sequence is set with the I/O controller based on user input. For example, the I/O controller may be manually set to OSD mode (such as using the physical buttons of the monitor), and the map engine may accept an input of key sequences from a keyboard registered with the I/O controller to correlate that input of key sequences to activate OSD mode in future actions by the peripheral device (e.g., subsequent peripheral input received by the I/O controller).

At block 504, the peripheral input is reviewed for the designated input sequence. For example, a map engine may coordinate a map data structure stored in the I/O controller that includes input sequences that are designated for special routing to the OSD such that peripheral input is to be transferred to the OSD circuit rather than to the host device.

At block 506, the peripheral input is routed from the I/O controller to a video processor in response to identification of the designated input sequence being received by the I/O controller. For example, a processor resource of an I/O hub may cause an electrical signal received from an input port to be directed to the OSD circuitry in response to analysis of the input to determine the input is for the OSD rather than the host, where input designated for the host is directed to an output port to the host device. Electrically routing the input data may include implementing an electrical switch in the hub to connect input and output ports as directed by the I/O controller and/or copying the designated signal to an output towards the appropriate destination, as examples.

At block 508, an OSD operation is executed by a display device based on the peripheral input received. For example, an OSD menu may be activated in response to peripheral input received at an I/O hub being equivalent to or otherwise corresponding to an OSD designated sequence. With the OSD menu active, the peripheral input may be used to navigate the OSD based on the user's preferences associated with the peripheral and the OSD functionalities.

Figure 6:
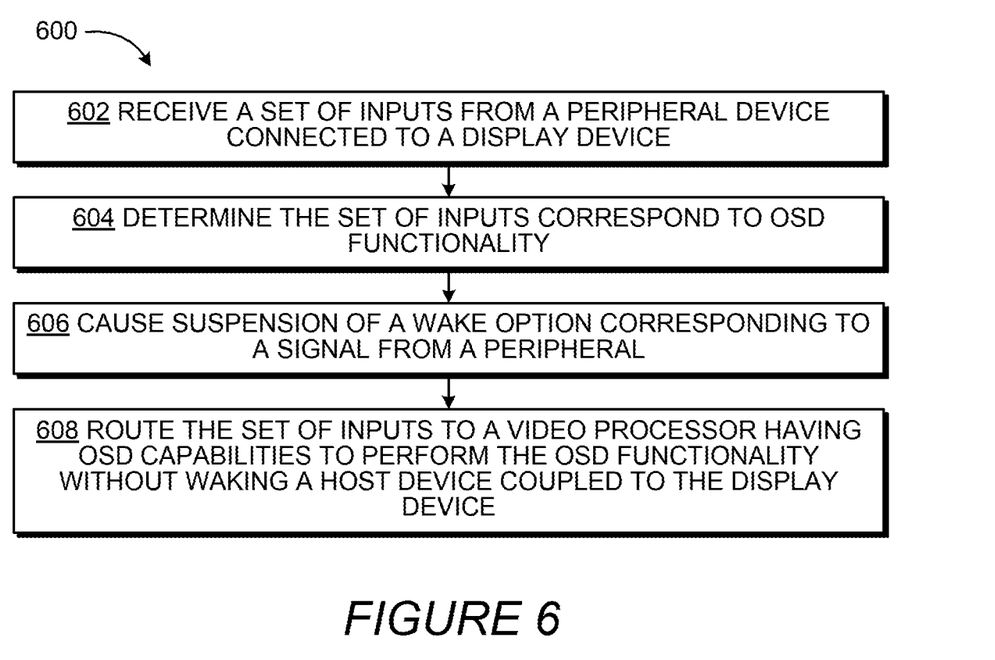

Referring to FIG. 6, example method 600 of operating an OSD may generally comprise receiving a set of inputs from a peripheral device connected to a display device, determining the set of inputs correspond to OSD functionality, causing suspensions of a wake option of the host, and routing the set of inputs to a video processor having OSD capabilities without waking the host device coupled to the display device. The method 600 may be performed by components of a display system as discussed herein, such as the OSD circuit 102, the I/O controller 104, and the map engine 106 of FIG. 1.

At block 602, a set of inputs is received from a peripheral device connected to a display device. For example, peripheral input from a keyboard coupled to a USB hub of a computer monitor may be received by an I/O controller of the computer monitor. At block 604, the set of inputs are reviewed and determined, by the I/O controller, whether or not the set of inputs correspond to OSD functionality, such as by comparing the peripheral input to a map data structure of assigned input combinations.

At block 606, a wake option corresponding to a signal from a peripheral is caused, by the I/O controller, to be suspended or otherwise bypassed. The host may be disabled from waking up by peripheral input to allow the peripheral to directly access the OSD of the display device without waking the host device (e.g., waking the computer monitor, but not waking the connected computing host). The wake option may be re-enabled once the I/O controller exits OSD mode.

At block 608, the set of inputs are routed to a video processor having OSD capabilities to perform the OSD functionality associated with the peripheral input without waking the host device coupled to the display device. For example, the set of inputs may correspond to opening a submenu on an OSD menu, the set of inputs may cause the display device to enter a high power state (e.g., wakes up) while the connected host device stays in a low power state (e.g., stays asleep) and the panel may be caused to present the OSD submenu and allow for selection of a functionality via the peripheral without waking the host device. In this manner, execution of the OSD operation may be performed in response to receiving input corresponding to the peripheral input received by the I/O controller and routed to a video processor when in OSD mode and in response to a designated input sequence being identified by the I/O controller.

Figure 7:
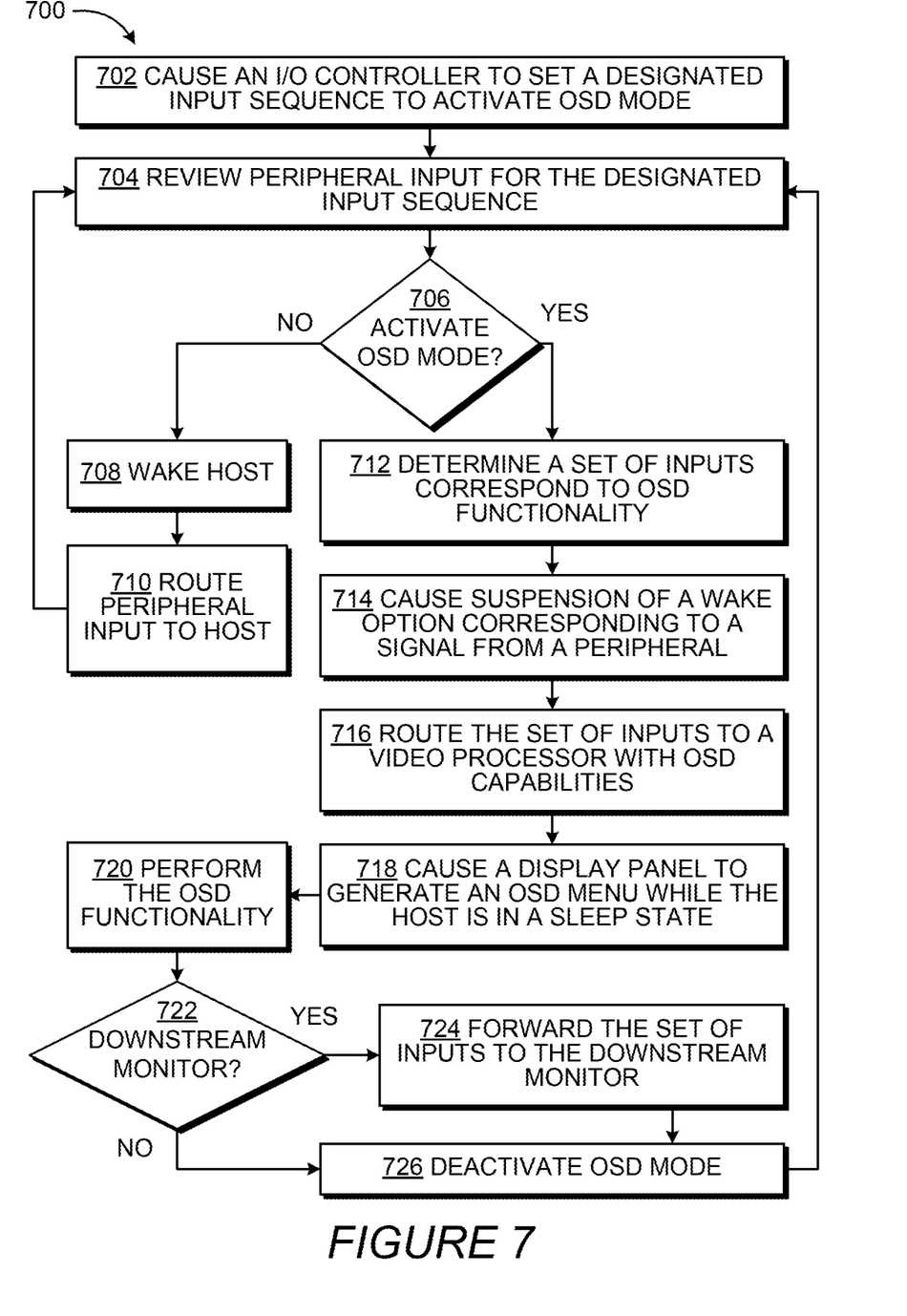

Referring to FIG. 7, example method 700 of operating an OSD may generally include blocks similar to blocks of FIG. 6 and provides additional blocks and details. In particular, FIG. 7 depicts additional blocks and details generally regarding determining whether OSD mode is activated and causing a panel to operate while the host is sleeping. The method 700 may be performed by components of a display system as discussed herein, such as the OSD circuit 102, the I/O controller 104, and the map engine 106 of FIG. 1.

At block 702, an I/O controller is caused, by an OSD circuit, to set a designated input sequence corresponding to activation of OSD mode. With the I/O controller configured via a map engine to be watching for particular input sequences for OSD functionality, incoming peripheral input received by the I/O controller is reviewed at block 704, such as by comparing the input sequences to a limited number of input sequences designated with OSD assignments.

At block 706, a determination is made as to whether the peripheral mode is active and/or whether the currently reviewed peripheral input indicates the OSD mode is to be enabled. If the determination is that the OSD mode is not active or to be activated, the host is woken up to an operating power state at block 708 and the peripheral input is routed from the I/O controller to the host. The I/O controller continues to review peripheral input for a set of inputs corresponding to OSD functionality (e.g., the process returns to block 704).

If the determination at block 706 is that the OSD mode is active or to be enabled for the received peripheral input, a determination as to what OSD functionality corresponds to the set of inputs is made at block 712. At block 714, a wake option is disabled, such as by disabling advanced configuration and power interface (ACPI) support related to types corresponding to I/O input, such as USB input.

At block 716, the set of inputs are routed to a video processor with OSD capabilities in response to activation of the OSD mode, and, at block 718, a panel of the display device is caused, by the OSD circuit, to generate an OSD menu while the host is in a low power state (e.g., a sleep state) to provide a visual indication to the user that the peripheral input is being transferred to the OSD. The OSD functionality corresponding to the set of inputs is performed at block 720. When the OSD mode is activated based on an OSD mode activation sequence, subsequent peripheral input may cause navigation of the OSD menu (instead of waking the host) until the OSD menu is closed. In some examples, the OSD functionality to be performed may be an OSD menu navigation operation and the OSD menu may visually update on the panel based on input provided by the peripheral device while the I/O controller is in OSD mode. In some examples, the OSD functionality may be performed without generating visual imagery on the panel of the display device, such as setting a timer that does not show on the OSD section of the panel but does cause sound to generate from speakers integrated or otherwise connected to the display device.

At block 722, a determination as to whether a downstream monitor is connected and should receive the set of inputs from the peripheral device. After the OSD functionality is performed according to the set of inputs, OSD mode may be deactivated at block 726 if there is no downstream monitor connected to the display device on which the OSD circuit performed the OSD functionality. In response to the determination that the downstream monitor is connected at block 722, the set of inputs are forwarded to the downstream monitor at block 724. The OSD mode on the I/O controller of the upstream monitor may be deactivated at block 726 after performing the OSD functionality and forwarding the set of inputs to any downstream devices. Deactivation may occur automatically after execution of the OSD functionality at block 720, occur automatically after expiration of a time limit without peripheral input, in response to receipt of an active request to deactivate OSD mode by receiving an OSD mode deactivation sequence from the peripheral device, or in response to receiving an OSD mode deactivation request from buttons on the display device housing.

In some examples, OSD mode may allow for peripheral input to be used to control the OSD in addition to allowance for OSD control by buttons on the monitor. In other examples, the OSD mode may disable interactions on the buttons of the monitor and restrict control of the OSD to peripheral input routed from the I/O controller integrated in the display device.

Figure 8:
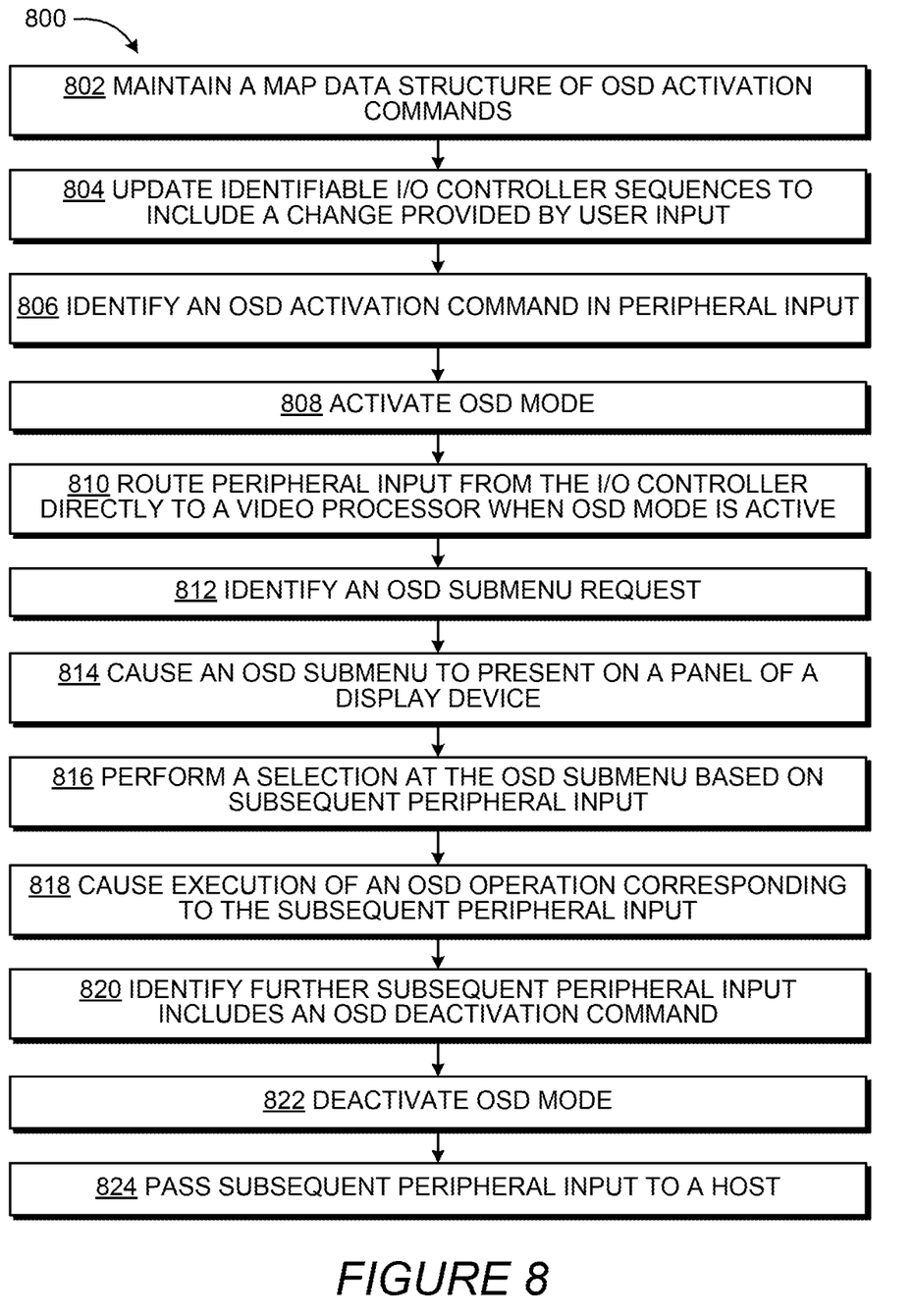

Referring to FIG. 8, example method 800 of operating an OSD may generally comprise setting a designated input sequence, reviewing peripheral input for the designated input sequence, routing the peripheral input from the I/O controller to a video processor when the designated input sequence is identified, and causing execution of an OSD operation corresponding to the peripheral input. The method 800 may be performed by components of a display system as discussed herein, such as the OSD circuit 102, the I/O controller 104, and the map engine 106 of FIG. 1.

At block 802, a map data structure of OSD activation commands is maintained, such as by a map engine, where the map data structure may be stored on the I/O controller. At block 804, the identifiable I/O controller sequences are updated to include a change provided by user input.

At block 806, the OSD activation command is identified in peripheral input from a peripheral device. For example, the peripheral input is compared to the reserved input sequences in the map data structure assigned to activate the OSD. In response to a positive match identification with an entry in the map data structure, the OSD mode is activated at block 808. The I/O controller may be placed into OSD mode in response to receipt of the OSD mode activation sequence, such as by setting a flag in memory of the I/O controller corresponding to OSD mode operation. In response to activation of the OSD mode at block 808, the I/O controller routes peripheral input directly to a video processor when the OSD mode is active.

At block 812, an OSD submenu request is identified by the OSD circuit from the peripheral input received by the I/O controller. At block 814, an OSD submenu is caused to present on a panel of a display device based on the peripheral input corresponding to the OSD submenu request. At block 816, a selection at the OSD sub menu is performed based on subsequent peripheral input, such as left, right, up, and/or down key sequences from a keyboard coupled to the I/O controller that routes to the OSD circuit when the I/O controller is in OSD mode. At block 818, an OSD operation is caused to execute corresponding to the subsequent peripheral input, such as selection of an OSD submenu using the enter key of a keyboard while the OSD mode is active on the I/O controller.

At block 820, further subsequent peripheral input is identified to include an input sequence corresponding to an OSD deactivation command. In response to identification of the OSD deactivation command at block 820, OSD mode is deactivated on the I/O controller at block 822, such as by unsetting a flag in memory of the I/O controller corresponding to OSD mode operation. At block 824, peripheral input received after deactivation of the OSD mode is passed to the host.

Although the flow diagrams of FIGS. 5-8 illustrate specific orders of execution, the execution order may differ from that which is illustrated. For example, the execution order of the blocks may be scrambled relative to the order shown. Also, the blocks shown in succession may be executed concurrently or with partial concurrence. All such variations are within the scope of the present description.

All the features disclosed in this specification (including any accompanying claims, abstract and drawings), and/or all the elements of any method or process so disclosed, may be combined in any combination, except combinations where at least some of such features and/or elements are mutually exclusive.

The terms "include," "have," and variations thereof, as used herein, mean the same as the term "comprise" or appropriate variation thereof. Furthermore, the term "based on," as used herein, means "based at least in part on." Thus, a feature described as based on some stimulus may be based only on the stimulus or a combination of stimuli including the stimulus. The article "a" as used herein does not limit the element to a single element and may represent multiples of that element. Furthermore, use of the words "first," "second," or related terms in the claims are not used to limit the claim elements to an order or location, but are merely used to distinguish separate claim elements.

The present description has been shown and described with reference to the foregoing examples. It is understood that other forms, details, and examples may be made without departing from the spirit and scope of the following claims.

What is claimed is:

1. A display system comprising:
   an on-screen display (OSD) circuit to operate a functionality of a display device;
   an input/output (I/O) controller to:
     receive input from a peripheral device connected to an input port;
     route the input from the peripheral device to an external device via an output port when passthrough mode is active; and
     route the input from the peripheral device to the OSD circuit when OSD mode is active; and
   a map engine to:
     cause activation of the OSD mode when an input sequence received by the I/O controller corresponds to an OSD mode activation sequence,
   wherein the OSD mode is deactivated after a time threshold expires without peripheral input being received by the I/O controller, the time threshold associated with a default time of display of the OSD.

2. The display system of claim 1, wherein:
   the map engine is to cause the I/O controller to watch for a user-defined key sequence corresponding to activation of the OSD mode; and
   the I/O controller is to route input from the peripheral device to the OSD circuit when the OSD mode is active until a second user-defined key sequence corresponding to deactivation of the OSD mode is received by the I/O controller.

3. The display system of claim 1, wherein:
the peripheral input causes display of an OSD menu on a panel of the display device and navigation through the OSD menu.

4. The display system of claim 1, wherein:
the peripheral input includes a user-defined key sequence to a specific OSD operation, the I/O controller to pass the specific OSD operation to the OSD circuit and immediately return the I/O controller to the passthrough mode for subsequent peripheral input.

5. The display system of claim 1, wherein:
the OSD circuit is to provide an OSD activation key feature for a user to enter a key combination to assign as a designated input combination to activate the OSD mode;
the I/O controller is to watch an input stream for the designated input combination to activate the OSD mode;
the map engine is to set the designated input combination for the I/O controller to watch based on user-defined input; and
in response to receipt of the designated input combination, the I/O controller to forward data from the input stream to a video processor when the I/O controller identifies a key sequence corresponding to the designated input combination when watching the input stream.

6. The display system of claim 1, wherein:
the map engine is to maintain a map of input sequences corresponding to OSD functionality;
the map engine is part of the I/O controller, such that the I/O controller activates OSD mode whenever one of the input sequences in the map is identified while watching the input from the peripheral; and
the peripheral input causes the OSD circuit to execute an operation to perform an OSD function based on input sequence forwarded to the OSD circuit from the I/O controller.

7. The display system of claim 1, wherein:
the I/O controller is a universal serial bus (USB) controller for a USB hub integrated in the display device; and
the OSD circuit is a portion of a video processor, the video processor integrated in the display device.

8. The display system of claim 1, wherein:
the I/O controller is to receive a response from the external device and route the response from the external device to the OSD circuit when the passthrough mode is active.

9. A non-transitory computer-readable storage medium (NTCRSM) comprising a set of instructions executable by a processor resource to:
set a designated input sequence to be recognizable by an input/output (I/O) controller using a map data structure of OSD activation commands based on a sequence of key inputs provided by a user;
review peripheral input received by the I/O controller for the designated input sequence;
route the peripheral input from the I/O controller:
directly to a video processor when the designated input sequence is identified by the I/O controller, and
to an external device when the designated input sequence is not identified by the I/O controller; and
cause execution of an on-screen display (OSD) operation corresponding to the peripheral input,
wherein OSD mode is deactivated after a time threshold expires without the peripheral input being received by the I/O controller, the time threshold associated with a default time of display of the OSD.

10. The NTCRSM of claim 9, wherein the set of instructions is executable by the processor resource to:
cause the I/O controller to activate the OSD mode to route the peripheral input to the video processor until an OSD mode deactivation input sequence is received by the I/O controller; and
cause an OSD menu to present on a panel of a display device.

11. The NTCRSM of claim 9, wherein the set of instructions is executable by the processor resource to:
in response to a determination that a peripheral input sequence is an OSD submenu request, cause the OSD menu to appear at an OSD submenu; and
perform a selection at the OSD submenu based on the peripheral input sequence.

12. The NTCRSM of claim 9, wherein the set of instructions is executable by the processor resource to:
maintain the map data structure with correlations between key combinations and OSD functionalities;
in response to a change in the map data structure, update the identifiable I/O controller sequences to identify and route the peripheral input to the OSD circuit,
wherein the change in the map data structure is based on user input; and
the change in the map structure includes a change to a key sequence corresponding to activation of the OSD mode by the I/O controller.

13. The NTCRSM of claim 9, wherein the set of instructions is executable by the processor resource to:
cause the I/O controller to receive a plurality of groups of peripheral input; and
send a first group of peripheral input to the external device;
send a second group of peripheral input to an OSD circuit based on the receipt of a user-defined OSD activation sequence loaded into the I/O controller; and
send the second group of peripheral input to a downstream display device.

14. The NTCRSM of claim 9, wherein the set of instructions is executable by the processor resource to:
receive a response from the external device and cause execution of a second OSD operation according to the response.

15. The NTCRSM of claim 14, wherein the response is based on the peripheral input.

16. A method of operating an on-screen display (OSD), comprising:
receiving, by an I/O controller, a set of inputs from a peripheral device connected to a display device;
determining, by the I/O controller, the set of inputs correspond to OSD functionality;
causing, by the I/O controller, suspension of a wake option corresponding to a signal from the peripheral device; and
routing, by the I/O controller, the set of inputs from the peripheral device to a video processor having OSD capabilities to perform the OSD functionality without waking a host device coupled to the display device,
wherein OSD mode is deactivated after a time threshold expires without peripheral input being received by the I/O controller, the time threshold associated with a default time of display of the OSD.

17. The method of claim 16, comprising:
causing, by an OSD circuit, the I/O controller to set a designated input sequence to activate OSD mode, the I/O controller to review the set of inputs for the designated input sequence and cause the routing in response to activation of the OSD mode; and causing, by the OSD circuit, a panel of the display device to generate an OSD menu, wherein subsequent peripheral input causes navigation of the OSD menu instead of waking the host until the OSD menu is closed.

18. The method of claim 16, comprising:

determining, by the I/O controller, the set of inputs do not correspond to OSD functionality; and routing, by the I/O controller, the set of inputs from the peripheral device to the host device coupled to the display device.

19. The method of claim 18, comprising:

receiving, by the I/O controller, a response from the host device based on the set of inputs; and routing, by the I/O controller, the response from the host device to the video processor.

* * * * *